Jan. 21, 1969 KANAO MURAKAMI 3,422,755

MIMEOGRAPH

Filed Sept. 13, 1966

INVENTOR.
KANAO MURAKAMI
BY Kurt Kelman
AGENT

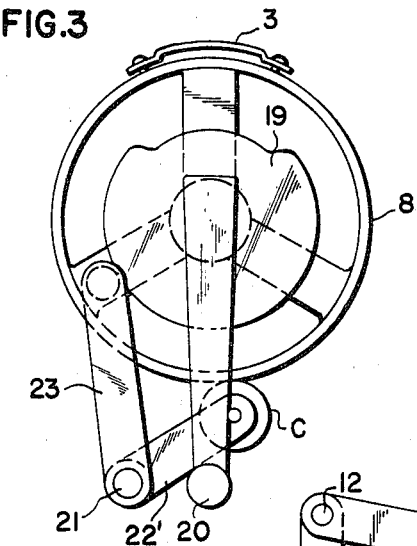
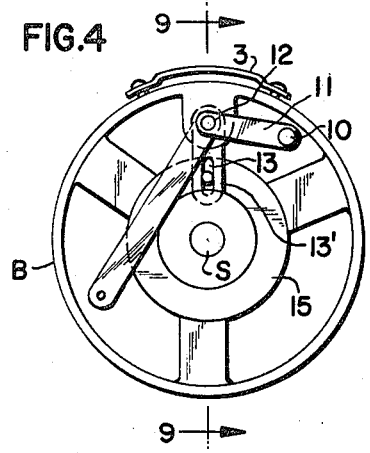
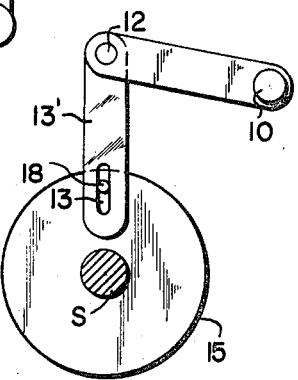
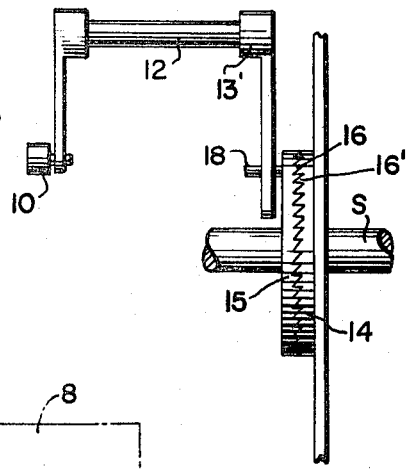
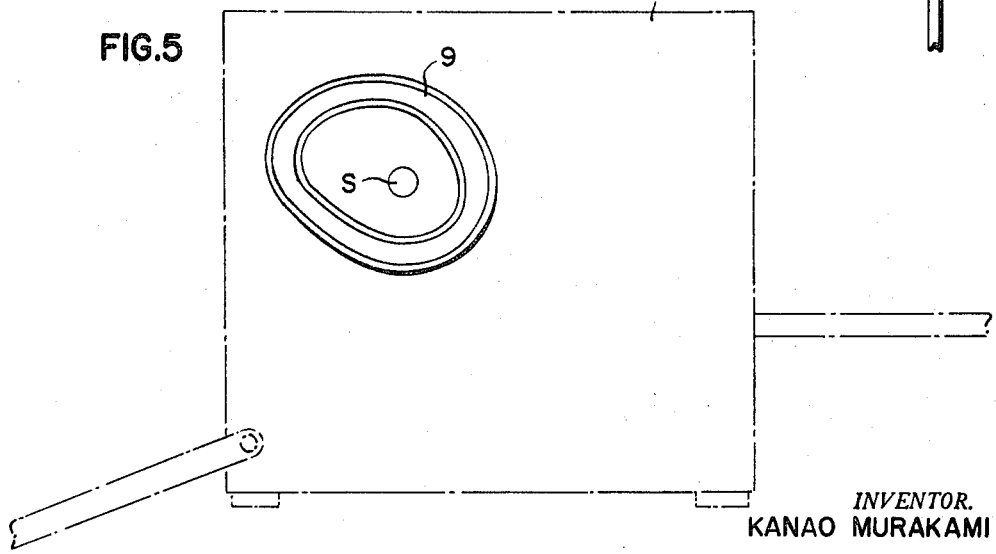

INVENTOR.
KANAO MURAKAMI
BY *Kurt Kelman*
AGENT

United States Patent Office 3,422,755
Patented Jan. 21, 1969

3,422,755
MIMEOGRAPH
Kanao Murakami, Osaka, Japan, assignor to Seiki Kogyo
Kabushiki Kaisha, Osaka, Japan
Filed Sept. 13, 1966, Ser. No. 579,167
Claims priority, application Japan, Sept. 14, 1965,
40/56,304
U.S. Cl. 101—119　　　　　　　　　　　　　10 Claims
Int. Cl. B41f 13/06, 27/14

ABSTRACT OF THE DISCLOSURE

An automatic ink supply for a mimeograph machine includes an ink distributing drum which rotates freely about a rotatable shaft between a pair of end bodies rotating with the shaft. An ink reservoir extends parallel to the shaft and is fixed to the end bodies for rotation therewith. A pair of foraminous sheets surround the drum and have ends fixed to the reservoir, with the outer foraminous sheet carrying a stencil and the reservoir communicating with the exterior surface of the drum. A presser roller extends parallel to this shaft for urging a sheet against the stencil during rotation of the shaft. A deflector is operated by the rotating shaft to deflect the presser roller from the stencil when the ink reservoir moves past the presser roller and to return it thereto thereafter.

---

The present invention relates to mimeographs.

More particularly, the present invention relates to a single-drum type of mimeograph which is adapted to provide a relatively large number of ink copies derived from a stencil which is mounted on the mimeograph to be rotated for transferring printed matter onto a copy sheet.

With conventional mimeographs of the above type, the printing becomes unclear after about a thousand prints have been made from waxed stencils, because there is no longer any proper supply of ink. With many types of known mimeographs, it is not possible to replenish the ink supply during operation of the mimeograph and, if more ink is supplied, the residue thereof remains at an end of the stencil paper and brakes the latter. While it has been proposed to provide ink-supply systems directing ink from the interior of the mimeograph drum toward the exterior thereof through suitable passages formed in the drum, so as to avoid drawbacks of the above type, this latter has not provided to be satisfactory because there is an insufficient flow of ink through the drum passages. Also, the ink is not evenly distributed because the passages are incapable of supplying ink in the required small amounts ideal for distribution through the stencil to each sheet which is printed, thus resulting in uneven printing. After a mimeograph of this type has not been used for some time, the ink cakes therein so as to create further problems. In order to correct problems of this latter type, ink passages have been formed extending longitudinally of the stencil but this, too, has not proved to be satisfactory, particularly with ink of high viscosity.

It is accordingly a primary object of the present invention to provide a mimeograph of the above type which will, however, avoid the above drawbacks.

In particular, it is an object of this invention to provide a mimeograph which will uniformly distribute the ink so that a proper printing of the copy sheets will be achieved.

Furthermore, it is an object of the invention to provide a mimeograph which is capable of printing from a given stencil far more sheets than has heretofore been possible.

Also, it is an object of the present invention to provide a mimeograph which will not experience any faulty operation as a result of drying and caking of ink during relatively long periods of non-use.

Furthermore, it is an object of the invention to provide a mimeograph which can be very easily and conveniently operated without any risk of soiling the hands of the operator, the copy sheets, or even the exterior surface of the stencil itself with ink.

It is an additional object to provide a mimeograph capable of returning to an ink reservoir excess ink which is not actually used during the printing operations.

The objects of the present invention also include the provision of a mimeograph which is characterized by an exceedingly simple and rugged construction, which can be manufactured at low cost, and which will operate reliably.

The mimeograph of the present invention includes an elongated rotary shaft and a support means which supports the shaft for rotation. An ink distributing drum surrounds, and is carried by, the shaft. The shaft passes through the drum which is freely turnable with respect to the shaft. A pair of end bodies are respectively fixed to the shaft for rotation therewith, and the drum is situated between these end bodies. An ink-reservoir means extends parallel to the shaft between, and is fixed to, the end bodies. Thus, the drum is situated between the ink-reservoir means and the shaft. An inner foraminous sheet extends circumferentially around the drum and has its ends fixed to the reservoir means, and an outer foraminous sheet surrounds the inner foraminous sheet and also has its ends fixed to the reservoir means. A presser roller means extends parallel to the shaft and is situated adjacent the outer foraminous sheet for pressing toward the latter a copy sheet which is to be printed, a stencil being adapted to be carried by the outer foraminous sheet for transferring the printed information to a sheet which is urged against the stencil by the presser roller means. A deflector means is operatively connected to the rotary shaft and coacts with the presser roller means for deflecting the latter away from the outer foraminous sheet when the ink reservoir means moves past the presser roller means so that the ink reservoir will clear the presser roller means during turning past the latter. Once the ink-reservoir means turns beyond the presser roller means, the deflector means returns the presser roller means to its operative position for pressing a sheet against a stencil on the outer foraminous sheet. A drum-turning means is operatively connected to the ink distributing drum for turning the latter with respect to the shaft through a predetermined angle which is a given fraction of the angle through which the shaft turns. In this way, at each increment of turning of the drum with respect to the shaft, ink will be distributed along the inner surface of the foraminous inner sheet to pass therethrough and the outer foraminous sheet to the stencil.

The invention is illustrated by way of example in the accompanying drawing which forms part of this application and in which:

FIG. 1 is a partly schematic perspective illustration of one possible embodiment of mimeograph according to the present invention, certain of the parts of FIG. 1 being broken away so as to illustrate the structure more clearly;

FIG. 3 is a transverse end view of the mimeograph showing in particular presser roller thereof and the deflector means for deflecting the presser roller;

FIG. 4 is an end view of an end of the assembly opposite from that of FIG. 3, FIG. 4 showing in particular the drum-turning means for rotating the ink-distributing drum;

FIG. 5 is an elevation of part of a support means and a cam carried thereby for actuating the structure which transmits to the ink-distributing drum rotary movement for turning the latter with respect to the shaft, this cam of FIG. 5 forming part of the drum-turning means;

FIG. 6 shows a part of the drum-turning means which coacts with the cam of FIG. 5 and which is operatively connected with the drum;

FIG. 7 is a transverse elevation of the structure of FIG. 6, showing the lever assembly which coacts on the one hand with the cam of FIG. 5 and on the other hand with a clutch for transmitting rotary movement to the ink-distributing drum;

Figure 1:
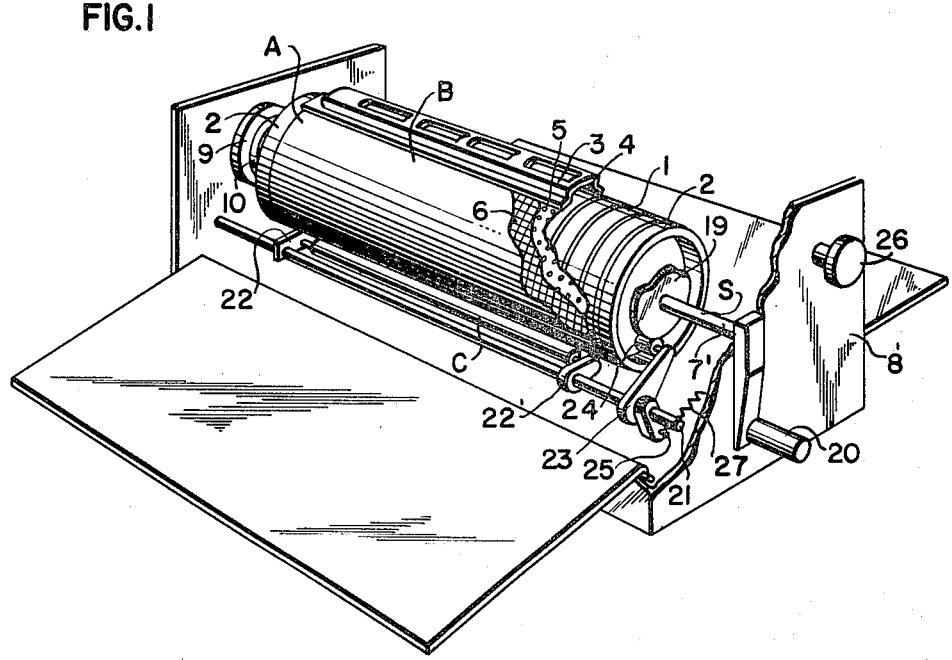
Figure 2:
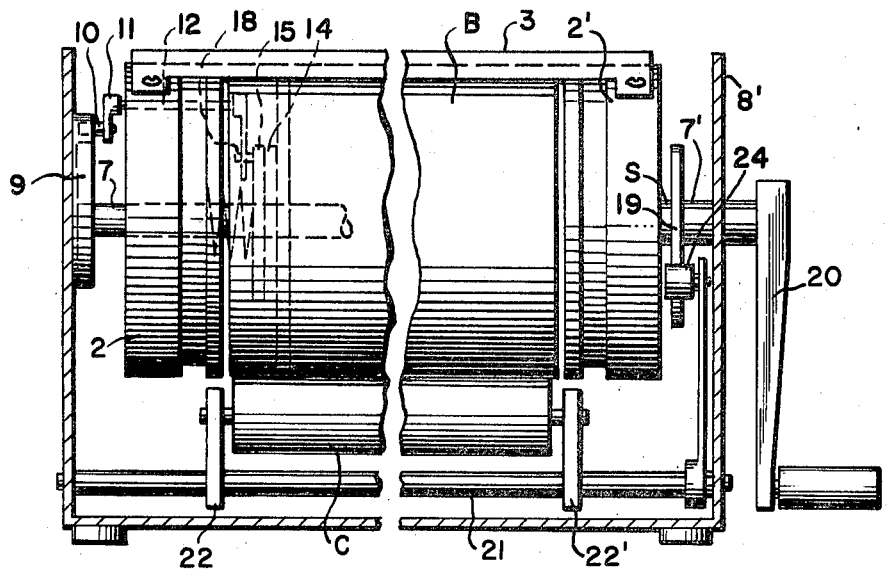
FIG. 2 is a fragmentary, partly sectional longitudinal elevation of the mimeograph.
Figure 8:
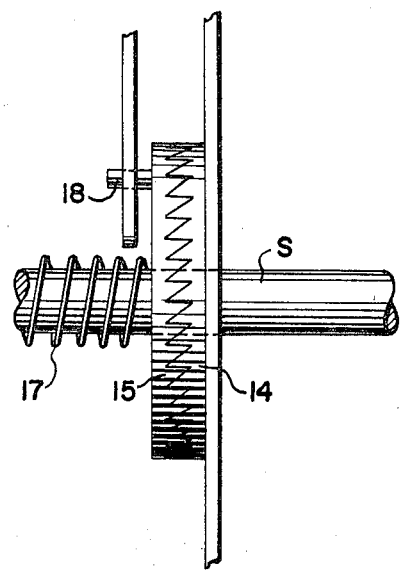
FIG. 8 is a fragmentary elevation on an enlarged scale, as compared to FIG. 6, showing the clutch for transmitting rotation to the drum in only one direction.

Referring now to FIGS. 1 and 2, it will be seen that the mimeograph of the invention includes a rotary shaft S which is supported for rotation by a support means which includes a pair of upstanding side plates 8 and 8' through which the shaft S extends, with the shaft being journalled in suitable bearings so that it is capable of rotating about its axis. An ink-distributing drum 1 surrounds the shaft S, with the latter extending coaxially through the drum 1 so that it is freely turnable with respect to the shaft S. The manner in which the drum 1, which is hollow, is mounted on the shaft S for free rotation with respect thereto is particularly apparent from FIG. 9. As may be seen from FIG. 2, a pair of end bodies 2 are respectively fixed to the shaft S for rotation therewith. The drum 1 is situated between these end bodies, with the latter having outer cylindrical surfaces of substantially the same diameter as the drum 1. An elongated ink-reservoir means 3 extends between, and has its ends fixed to, the end bodies 2, so that the reservoir means 3 will rotate with the bodies 2 which in turn will rotate with the shaft S. This elongated ink-reservoir means 3 has a hollow interior reservoir portion 4 which receives ink and which communicates with the exterior surface of the drum 1. The circumferential length of the drum 1 is somewhat longer than that of a stencil paper which is adapted to be mounted on the machine. The interior ink-reservoir 4 has a length, parallel to the shaft S equal to the width of the stencil paper A. Such a stencil paper is shown schematically in FIG. 1.

An inner foraminous sheet 5, which in FIG. 1 is a simple sheet formed with circular openings uniformly distributed throughout the sheet, extends circumferentially around the drum 1 and has its ends fixed to the reservoir means 3, and this foraminous sheet 5 may be made of metal wire, a perforated metal plate, or a film of synthetic resin. The inner foraminous sheet 5 is in turn surrounded and engaged by an outer foraminous sheet 6 made of cotton or synthetic resin fiber, and also having its ends fixed to the reservoir means 3.

Thus, the reservoir means 3 together with the end bodies 2 and the pair of foraminous sheets 5 and 6 form an outer unit B with respect to which the inner ink-distributing drum is turnable.

A drum-turning means coacts with the drum 1 for turning the latter with respect to the shaft S in response to rotary movement of the shaft. This drum-turning means includes a cam 9 which is fixed to the left wall 8 of the support means, as viewed in FIG. 2, and this cam 9 has adjacent its periphery an elongated camming groove which may have the configuration shown most clearly in FIG. 5.

FIGS. 4–9 illustrate the details of the drum-turning means. Thus, this structure includes, in addition to the stationary cam 9, a cam-follower roller 10 received in the groove of the cam 9 and freely turnable on one end of an outer lever 11 which is fixed to, and projects radially from, a rotary second shaft 12 which extends turnably through a suitable opening formed in a part of the end body 2 which is adjacent to the cam 9, as is particularly apparent from FIGS. 4 and 9. An inner lever 13' is fixed to the inner end of the rotary shaft 12 and is formed with an elongated slot 13 shown most clearly in FIG. 7. This slot 13 receives a pin 18 which is fixed to an outer clutch member 15 which coacts with an inner clutch member 14 which is fixed directly to one end of the drum 1, as is particularly apparent from FIG. 9.

Figure 9:
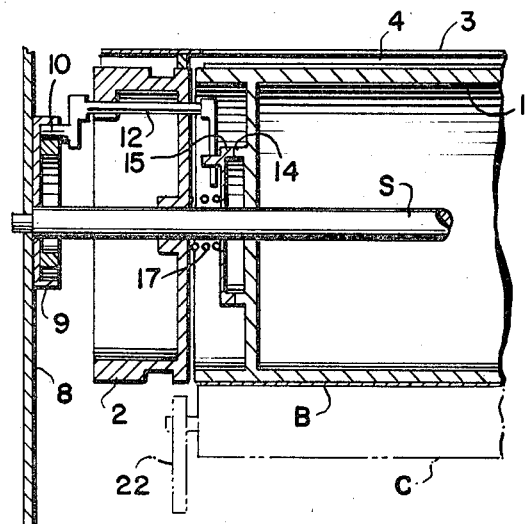
FIG. 9 is a fragmentary longitudinal section taken along line 9—9 of FIG. 4 in the direction of the arrows.

The clutch members 14 and 15 are freely rotatable with respect to the shaft S, and they respectively have teeth 16 and 16' in the nature of ratchet teeth which coact with each other so that, when the outer clutch member 15 is turned in one direction, it will not transmit rotary movement to the inner clutch member 14 while, when it turns in an opposite direction, it will transmit rotary movement thereto and thus turn the drum 1 in a given direction of rotation. In this way only one direction of rotary movement will be transmitted to the drum when the lever 13' swings in one direction. A spring 17 surrounds the shaft S and presses with one end against the clutch member 15 and with its opposite end against the adjacent end body 2, as shown in FIG. 9. In this way, while the outer clutch member 15 is pressed toward the inner clutch member 14, it is capable of moving outwardly away from the latter when the teeth of the clutch member 15 ride over the teeth of the clutch member 14. The manner in which these particular components coact is particularly apparent from FIG. 8. It is apparent that with this construction, while all of the components of the drum-turning means rotate with the shaft S, except the cam 9 of the drum-turning means, this drum-turning means will nevertheless have at its shaft 12 rotary movement with respect to the shaft S. This rotary movement will be transmitted through the clutch to the drum 1 for turning the latter with respect to the shaft S through a given angle which is a predetermined fraction of the angle through which the shaft S turns.

The stencil A is mounted on the outer foraminous sheet 6 in any suitable, well-known manner. A presser roller means C is provided for pressing a sheet which is to be printed toward the outer foraminous sheet 6 and thus toward a stencil mounted on the latter. This presser roller means C, the details of which are shown most clearly in FIGS. 1–3, includes an elongated presser roller in the form of a shaft covered with a suitable resilient material, such as rubber or soft synthetic resin, and this latter shaft is fixed by radial arms 22 to an elongated shaft 21 which is supported at its ends for rotary movement by the support means, and in particular by the pair of plates 8 and 8' thereof. A lever 25 is fixed at one end to the shaft 21 and at its opposite end to an elongated spring 27 which, distant from the lever 25, is fixed to a lever extending from a rotary shaft which is fixed to a knob 26 and which is capable of being maintained in a predetermined angular position selected by the operator. By turning the knob 26, the operator can tension the spring 27 to pull on the lever 25 and thus turn the shaft 21. The shaft 21 will only turn until the presser roller engages the stencil, and through the setting of the knob 26 the spring 27 can be tensioned to provide a pressure of the presser roller means upwardly against the stencil. The knob 26 can be turned by the operator to an inoperative position relaxing the spring 27 and permitting the presser roller to turn down away from the stencil, so that one stencil can easily and conveniently be replaced by another.

A deflector means is provided and is operatively connected with the rotary shaft S and with the presser roller means for deflecting the latter away from the ink reservoir means 3 when the latter turns past the presser roller means, so that the ink reservoir means 3 will clear the presser roller means. This deflector means includes a cam 19 fixed to the shaft S for rotary movement therewith and engaging a cam-follower roller 24 which is carried by one end of a lever 23 which is fixed to the shaft 21. As is particularly apparent from FIGS. 1 and 3, which show most cleary the configuration of a cam 19, when the ink-reservoir means 3 is in the region of the presser roller means C, the cam 19 carrying roller 24 will turn the lever 23 and thus the shaft 21 in a clockwise direction, as viewed in FIG. 3, thus displacing the presser roller means away from the outer foraminous sheet or, in other words, away from the unit B shown in FIG. 3, with the result that the presser roller means will not engage the reservoir 3 which thus clears the presser roller as it turns past the latter. As is also apparent from FIG. 3, the configuration and angular orientation of the cam 19 is such that once the reservoir means 3 moves past the presser roller means C, the deflector means will return the presser roller means C back to its operative position for pressing a sheet against a stencil carried by the unit B.

One end of the shaft S extends outwardly beyond the plate 8' and carries a crank 20 so that the operator can turn the shaft S and thus actuate the mimeograph.

With the structure of the invention described above, assuming that there is a supply of ink in the reservoir means, that a stencil has been mounted on the unit B and the operator is turning the shaft S, the drum-turning means will turn the drum 1 through a given angle which is a predetermined fraction of the angle through which the shaft S turns. In this way, at each increment of turning of the drum 1 with respect to the shaft S, the outer surface of the drum 1 will turn with respect to the shaft S, the outer surface of the drum 1 will turn with respect to the inner surface of the foraminous sheet 5 to distribute ink along the latter with the ink passing through the sheets 5 and 6 and through the stencil onto a sheet which is to be printed. Once the drum 1 has turned through a plurality of increments, the total of which is 360° with respect to the shaft S, the ink will have been distributed along the entire surface of the sheet 5 which is directed toward the drum 1. It is to be noted that initially it is not necessary to rotate the shaft S through an angle sufficient to provide a complete revolution of the drum 1 since, when the machine is new, there is already a proper supply of ink distributed throughout the foraminous sheet 6. In addition, from one use to the next, there will remain in the foraminous sheet 6 sufficient ink to eliminate the necessity of a redistribution of the ink throught the unit B.

The relative angular positions of the drum-turning means and the deflector means are such that the drum 1 is turned with respect to the shaft S when the presser roller means C is deflected away from the unit B so that, during the actual turning of the drum 1 with respect to the shaft S, the presser roller does not urge the unit B against the drum 1. While ink will be taken from the reservoir along one longitudinal side edge thereof to be distributed to the sheet 5 at its inner surface, excess ink will be returned to the reservoir at its opposite longitudinal side edge during rotation of the drum 1 with respect to the unit B.

During operation of the mimeograph, any ink which flows out through the foraminous sheets 5 and 6 to the rear surface of the stencil paper will be returned back through the foraminous sheets to the drum 1, so that a highly effective and proper distribution of the ink is achieved.

It has been found that with the structure of the present invention there will be no unevenness in the printing, and very little, if any, of the ink comes in contact with the outer air so that the ink does not cake. Only after an extended period of non-use will any ink become caked, and even this latter ink will become distributed into a fresh ink supply so that there is no problem encountered with respect to the caking and drying or hardening of ink. Furthermore, only that ink which passes through the perforations of the stencil paper will be consumed, while the rest of the ink will be returned into the reservoir so that leakage of ink, resulting from parts thereof remaining at undesired locations, will not occur. With the mimeograph of the invention, it has been found that many more prints can be made than with conventional mimeographs, and the supply of ink during actual operation is very easy to carry out because the ink is only required to be introduced into the reservoir means 3 which is easily accessible at the exterior of the mimeograph. With the structure of the present invention several thousand prints have been made, from one stencil, and it is believed to be possible to make even more prints when stencil paper is improved.

Because the foraminous sheet 5 is directly connected to the reservoir means 3 which is in turn mounted on the end bodies 2, with the sheet 5 surrounding the drum 1, this sheet 5 need not be very strong and it is possible to make very clear prints even though the sheet 5 is extremely thin. In a preferred embodiment, the sheet 5 is made of metal and has a thickness of 0.15–0.3 mm. The perforations which are indicated in FIG. 1 have a diameter of 0.6 mm., the perforation ratio being such that, while the perforations are uniformly distributed throughout the sheet, the perforations occupy on the order of 37.5% of the total sheet area. In other words, the ratio of the total area of the perforations to the total sheet area is 37.5%.

It is preferred that the unit B turn in the same direction in which the ink is fed, in accordance with the pressure applied by the presser roller means C. A space on the order of 0.1–0.3 mm. is provided between the exterior surface of the drum 1, at least at the circumferentially grooved portions thereof, and the inner surface of the foraminous sheet 5. The drum-turning means turns the drum 1 on the shaft S in a direction opposite to the direction of rotation of the shaft.

With a preferred construction, at each revolution of the shaft S provided by manual turning of the crank 20 through a revolution, the drum 1 is turned through an angle of 10–20°. However, it is also possible to arrange the drum-turning means so that the drum 1 will be turned with respect to the shaft S only after a given plurality of revolutions of the shaft. While manual operation by way of the crank 20 is illustrated, a motor may be connected through a suitable transmission to the shaft S for rotating the latter. Also the ink-supply reservoir may be situated in a hollow space between the drum 1 and the end bodies 2 by arranging the structure so that the drum 1 is freely received in the end bodies 2.

Furthermore, instead of a drum-turning means which includes the clutch structure 14, 15, it is possible to use other constructions for this purpose, such as a different cam actuating a ratchet mechanism or a Geneva stop motion. It is also possible to rotate the drum simply by means of situating on the adjacent side plate 8 a projection which engages a part of the drum during each revolution of the shaft S.

Figure 10:
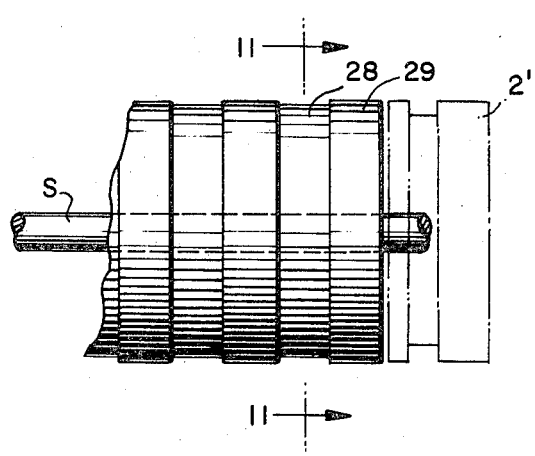
FIG. 10 is a fragmentary elevation showing details of the ink-distributing drum.
Figure 11:
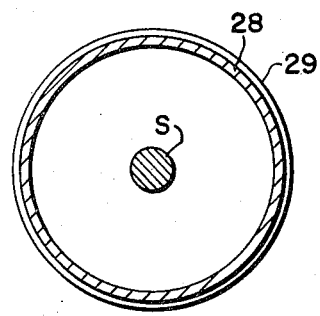
FIG. 11 is a transverse section taken along line 11—11 of FIG. 10 in the direction of the arrows.

Referring now to FIGS. 10 and 11, it will be seen that the drum 1 is formed at its exterior surface with circumferential grooves 28 separated by the outer surface portions 29 of the drum which extend circumferentially between the grooves 28. Each of the grooves 28 preferably has a width on the order of 3–20 mm., while each circumferential outer surface portion 29 has a width on the order of 1–5 mm., and the depth of each groove 28 is on the order of 0.1–0.5 mm. Thus, the depth of the grooves at the exterior of the drum are on the order of one tenth of the width of the projections between the grooves. If the ratio between the width of the projection 29 and the width of the groove 28 is made larger, the rotation resistance of the drum can be reduced without any undesirable influence on the printing operations.

Figure 12:
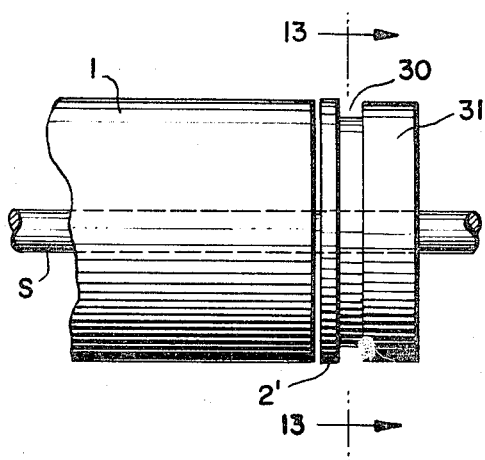
FIG. 12 is an elevation of an end body, showing the details thereof.
Figure 13:
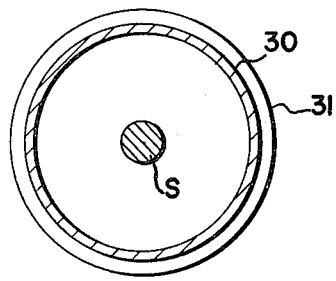
FIG. 13 is a transverse section taken along line 13—13 of FIG. 12 in the direction of the arrows.

Referring now to FIGS. 12 and 13, it will be seen that each of the end bodies 2 has an exterior surface 31 and is formed with a relatively deep circumferential groove 30. The groove 30 may have a width of 7–12 mm. and a depth of 3–10 mm. With this construction even if it should happen that the stencil paper A is shifted to the left or right, axially of the unit B, the exterior surfaces 31 of the bodies 2 will still be clear of the stencil and will not be soiled with ink so that in this way the exterior surface 31 is kept clear when the device is cleaned. Thus, the end bodies 2 can always be kept clear of the ink and neither the printing paper or the hands of the operator will be soiled.

Figure 14:
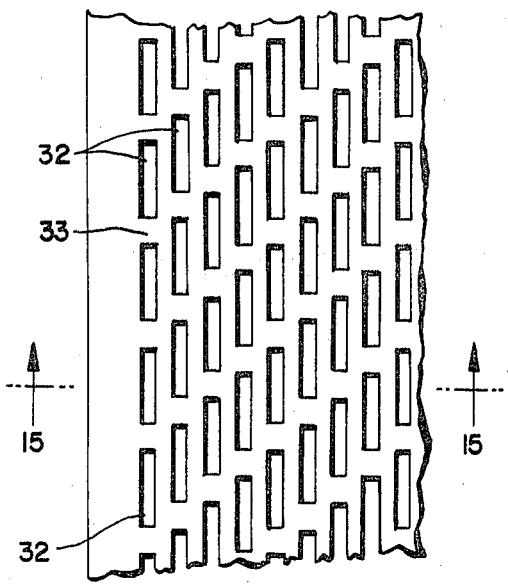
FIG. 14 is a fragmentary elevation showing, in a developed view, another embodiment of an inner foraminous sheet.
Figure 15:
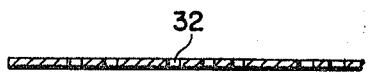
FIG. 15 is a transverse section of the sheet of FIG. 14 taken along line 15—15 of FIG. 14 in the direction of the arrows.

Referring now to FIGS. 14 and 15, instead of an inner foraminous sheet formed with circular openings, as referred to above, it is possible to provide a foraminous sheet in the form of a plate 33 formed with elongated openings 32 of substantially rectangular configuration extending parallel to each other in helical rows, as shown in FIG. 14, with the elongated openings 32 extending circumferentially around the drum 1. The space between adjacent openings 32, laterally of the sheet 33, is on the order of one fifth of the length of each opening. These openings 32 are uniformly distributed throughout the sheet in the helical rows indicated in FIG. 14 so that the openings are staggered and the ink will ooze out evenly while being distributed.

It will be noted that, with a sheet structure as shown in FIGS. 14 and 15 for the inner foraminous sheet, this sheet has a considerable strength in the longitudinal direction of the openings 32, while it may be relatively weak in the lateral direction. With this construction, it is not necessary to give the foraminous sheet 33 an initial curved configuration which it will permanently retain before being applied around the drum 1. The same is true of a sheet as shown in FIG. 1 where the sheet is formed of woven fiber of metal and is formed with circular openings. These sheets can be very quickly assembled with the remaining structure.

While the openings of FIGS. 14 and 15 are shown as being rectangular, other shapes can be used such as parallelograms, elongated hexagons, or ellipses.

What is claimed is:

1. In a mimeograph: a rotary shaft; support means supporting said shaft for rotation; and ink-distributing drum through which said shaft passes, said drum being freely rotatable on, and with respect to, said shaft; a pair of end bodies fixed to said shaft for rotation therewith, said ink-distributing drum being situated on said shaft between said end bodies; elongated ink-reservoir means extending parallel to said shaft between, and fixed to, said end bodies for rotation with the latter and with said shaft; an inner foraminous sheet extending circumferentially around said ink-distributing drum and having ends fixed to said reservoir means; an outer foraminous sheet engaging and surounding said inner foraminous sheet and also having ends fixed to said ink-reservoir means, said outer foraminous sheet being adapted to have a stencil placed against the same and said reservoir means communicating with the exterior surface of said ink-distributing drum; presser roller means extending parallel to said rotary shaft for urging a sheet against a stencil carried by said outer foraminous sheet during rotary movement of said shaft; deflector means operatively connected with said rotary shaft for rotation therewith and coacting with said presser roller means for deflecting the latter away from said outer foraminous sheet when said ink-reservoir means moves past said presser roller means so that said ink-reservoir means will clear said presser means, said deflector means returning said presser roller means back toward said outer foraminous sheet after said reservoir means has moved beyond said presser roller means; and drum-turning means operatively connected with said ink-distributing drum for turning the latter with respect to said shaft and said inner foraminous sheet, said drum-turning means automatically turning said drum with respect to said shaft in response to rotary movement of the latter through an angle which is a predetermined fraction of the angle through which said shaft rotates.

2. The combination of claim 1 and wherein said drum rotates, in response to actuation by said drum-turning means, through a fractional part of a revolution during each revolution of said shaft.

3. The combination of claim 2 and wherein said fractional part of said revolution is less than 90°.

4. The combination of claim 1 and wherein said drum-turning means turns said drum with respect to said shaft simultaneously with the deflection of said presser roller means away from said outer foraminous sheet by said deflector means.

5. The combination of claim 1 and wherein said drum-turning means includes a cam fixedly carried by said support means; an outer lever coacting with said cam; a second shaft fixed to said outer lever, extending parallel to said rotary shaft and carried by one of said end bodies for rotation with the latter and with respect thereto; an inner lever fixed to said second shaft, extending at a predetermined angle with respect to said outer lever and formed with a slot; and a clutch operatively connected with said drum for rotating the latter in only one direction, said clutch having a pin extending through said slot to be actuated through said inner and outer levers and said cam to provide turning movement of said drum with respect to said shaft during given fractional parts of the total rotation of the latter.

6. The combination of claim 1 and wherein said ink-distributing drum has an exterior surface formed with circumferential grooves distributed along said drum.

7. The combination of claim 6 and wherein said grooves have a depth which is on the order of one tenth of the axial distance therebetween.

8. The combination of claim 1 and wherein said end bodies are each in the form of a body having an outer cylindrical surface coaxial with and of substantially the same diameter as said drum, and said outer cylindrical surface of each end body being formed with a relatively deep, circumferential groove.

9. The combination of claim 1 and wherein said inner foraminous sheet is in the form of a sheet member formed with elongated openings passing therethrough and uniformly distributed with respect to the area of said inner sheet.

10. The combination of claim 9 and wherein said elongated openings of said sheet are of substantially rectangular configuration and extend circumferentially with respect to said rotary shaft, with the axial distance between said elongated openings being a fraction of their length and said openings being arranged in rows extending helically around said drum.

References Cited

UNITED STATES PATENTS

| | | | | |
|---|---|---|---|---|
| 1,530,203 | 3/1925 | Rosenhauer | | 101—119 |
| 1,559,067 | 10/1925 | Brasseur | | 101—119 |
| 2,445,666 | 7/1948 | Ellam | | 101—119 |

ROBERT E. PULFREY, *Primary Examiner.*

F. A. WINANS, *Assistant Examiner.*